S. H. KEEFER.
HYDRAULIC FEED CLUTCH MECHANISM.
APPLICATION FILED NOV. 2, 1910.
986,830.
Patented Mar. 14, 1911.
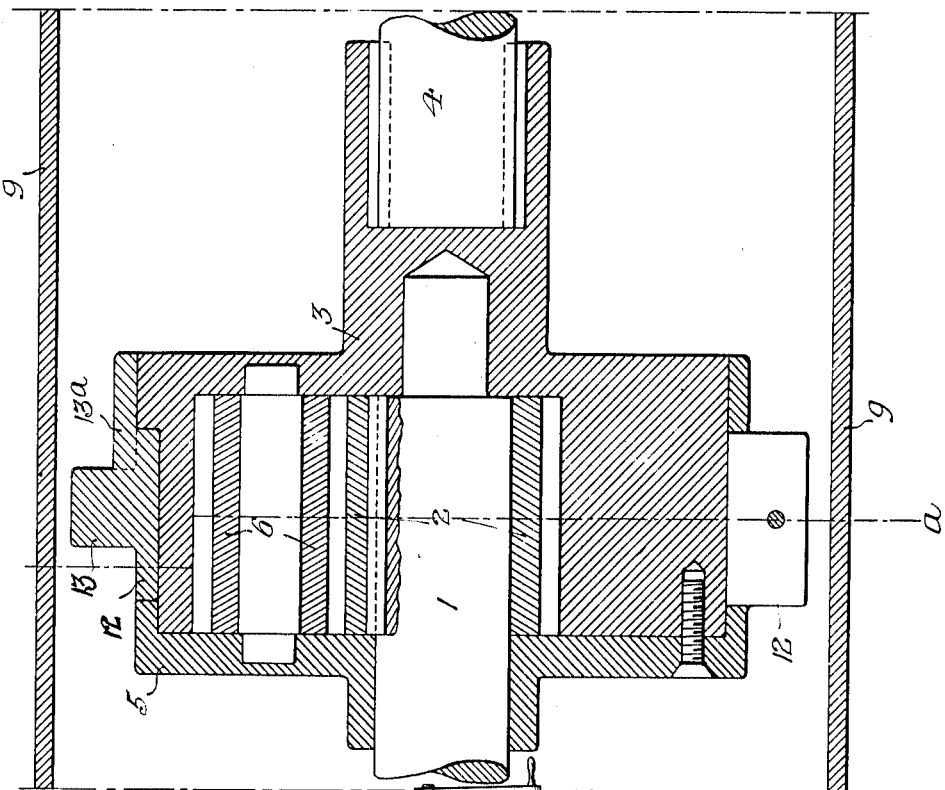
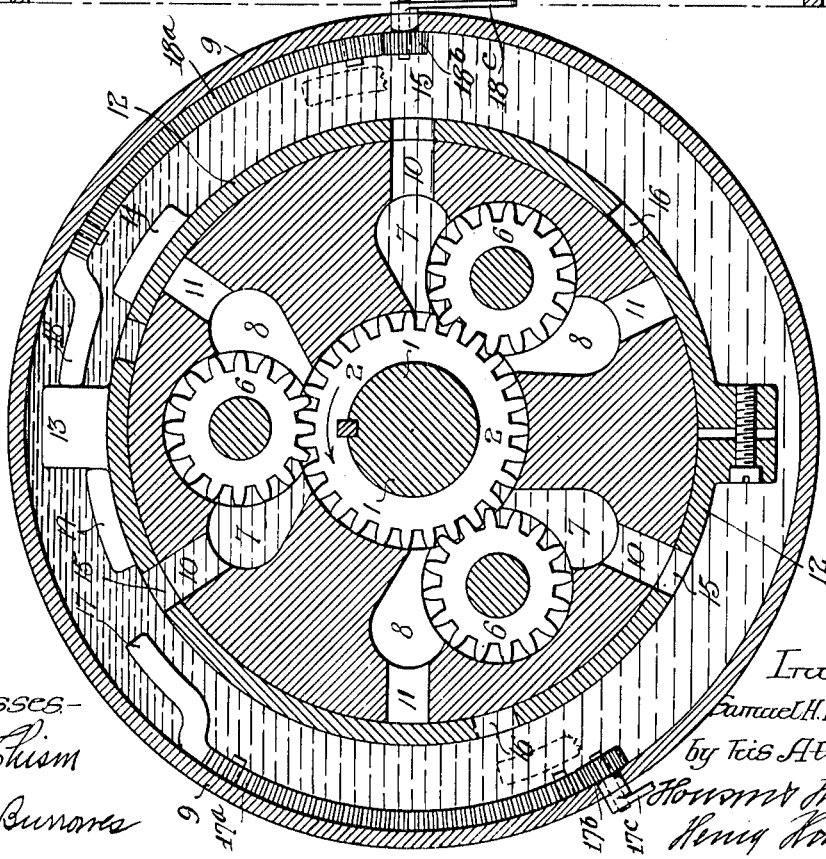

UNITED STATES PATENT OFFICE.

SAMUEL H. KEEFER, OF PLAINFIELD, NEW JERSEY, ASSIGNOR TO NILES-BEMENT-POND COMPANY, OF JERSEY CITY, NEW JERSEY, A CORPORATION OF NEW JERSEY.

HYDRAULIC FEED-CLUTCH MECHANISM.

986,830. Specification of Letters Patent. Patented Mar. 14, 1911.

Application filed November 2, 1910. Serial No. 590,338.

*To all whom it may concern:*

Be it known that I, SAMUEL H. KEEFER, a citizen of the United States, and a resident of Plainfield, Union county, New Jersey, have invented certain Improvements in Hydraulic Feed-Clutch Mechanism, of which the following is a specification.

One object of my invention is to provide a novel form of clutch which shall be capable of adjustment to transmit power from a driving to a driven member for a predetermined time and which shall thereafter automatically cause said two members to be operatively disconnected; it being especially desired that the various parts constituting my invention shall be few in number as well as simple and substantial in construction.

Another object of the invention is to provide a hydraulic clutch mechanism particularly adapted for use in connection with a structure having a reciprocating or oscillating part and which shall be capable of transmitting power to a driven member from a suitable source for a predetermined time, after which it shall automatically act to disconnect said member from said source; it being also desired that the invention shall include means whereby the time that the driving and driven members are connected may be varied within certain limits.

These objects and other advantageous ends I secure as hereinafter set forth, reference being had to the accompanying drawings, in which:—

Figure 1, is a horizontal section illustrating the detail construction of my invention, and Fig. 2, is a vertical section, taken at right angles to the section of Fig. 1.

In the above drawings 1 represents a shaft connected to a source of power such as a reversing motor and which is driven thereby first in one direction and then in the other. On this shaft is fixed a gear 2 designed to closely fit within a body 3 keyed or otherwise fixed to a second shaft 4; this body having a removable end plate 5 as shown and being provided with recesses for three or any desired number of gears 6 so mounted as to mesh with the teeth of the gear 2. Considering this latter gear and one of the planetary gears 6, it will be seen that there are provided in the body 3 two chambers 7 and 8 on opposite sides of the gear 6 into which this latter and the gear 2 open adjacent their points of engagement. Obviously there are two chambers placed as indicated above, to each of the gears 6.

The shafts with the mechanism heretofore described are preferably inclosed by a casing 9, in the present instance made concentric with said shafts and containing some liquid such as glycerin, oil or the like, and there is a port 10 extending radially outward from each of the chambers 7 so as to open to the casing 9; there being similar ports 11 leading radially outward from the chambers 8 and also communicating with the interior of the casing, whose outer shell is spaced some distance away from the body 3. Mounted on this body is a circumferentially movable sleeve 12 having a projecting lug 13, its movement being limited however by two fixed lugs 14 and 14$^a$ preferably formed integral with the part 3. The sleeve 12 has two sets of ports indicated at 15 and 16; the first being so placed as to be capable of permitting free flow of liquid through the ports 10 from the chambers 7 into the interior of the casing 9 at such time as the lug 13$^a$ is in engagement with the lug 14. This lug 13$^a$ projects laterally from the part 13 so as to be capable of engaging either of the lugs 14 or 14$^a$. The ports 16 are so placed that under these conditions the ports 11 are closed by the sleeve 12, but when the lug 13$^a$ is in engagement with the lug 14$^a$ said ports 16 are in line with the ports 11 and permit free communication or flow of liquid between the interior of the casing 9 and the chambers 8. A pair of dogs 17 and 18 are mounted so as to project within the casing 9 and are capable of being engaged by the lug 13 so as to cause motion of the sleeve 12 upon the body 3; being adjustably mounted to permit of variation of their angular distance apart within said casing. For example I have shown in dotted lines in Fig. 1 these dogs in two others of their possible positions and for purposes of adjustment I have shown them as connected to or forming part of curved racks 17$^a$ and 18$^a$ respectively engaged by the pinions 17$^b$ and 18$^b$ which may be turned at will by operating cranks 17$^c$ and 18$^c$ outside the casing 9.

With the above described arrangement of parts I may connect the shaft 1 to a driving motor of the reversing type, although any other suitable source of power may be employed, while the shaft 4 is connected to some machine or device to be operated, such as a planer. If now, the motor be operated to turn the shaft 1 in a counterclockwise direction, as indicated by the arrow, liquid will be drawn from the casing 9 through the ports 15 and 10 into the chambers 7, from whence it will be carried by the gear wheels into the chambers 8 and ports 11; it being understood that there is sufficient liquid in said casing to at all times cover the ports 15 and 16. Since these latter are closed off by the sleeve 12, the gears 6 will almost immediately be prevented from further revolution by the accumulated liquid, and the body 3, with the sleeve 12, will likewise be carried around in a counterclockwise direction until the lug 13 strikes the lug 17. Since, however, the shaft 4 is keyed to or forms part of the body 3, it likewise will be driven in a counterclockwise direction for the same length of time. Engagement of the lug 13 with the dog 17 causes the sleeve 12 to be held still while the body 3 rotates sufficiently to cut off the ports 10 from communication with the interior of the casing 9 and establish communication between said casing and the chambers 8 by reason of the ports 16 being brought into line with the ports 11. Liquid is at once exhausted from said latter ports 11 and chambers 8 and the continued revolution of the shaft 1 causes the gear 2 with the gear 6 to quickly exhaust all liquid from the chamber 7 and ports 10, whereupon the body 3 is operatively disconnected from the gear 2 since the gears 6 are free to turn idly relatively thereto. The shaft 1 may now continue to turn in a counterclockwise direction until such time as some form of reversing device, forming no part of the present invention, causes it to be driven in an opposite direction, whereupon liquid is drawn from the casing 9, through the ports 16 and 11 into the chambers 8, and thence caused to accumulate in the chambers 7 and the ports 10. As a result the gears 6 are again locked from movement and with the body 3 are turned by the shaft 1 and gear 2 in a clockwise direction until the lug 13, being brought into engagement with the dog 18, is moved thereby into the position shown in Fig. 1. Liquid is thus exhausted from the ports 11 and chambers 8 into chambers 7 and ports 10 and 15; the former ports and chambers being emptied as in Fig. 1, the gears 6 are again permitted to turn idly without moving the body 3, and the shaft 1 is free to continue its revolution until such time as it is again reversed.

While I have described the device as if it were connected to a reversing motor and a planer, it is to be understood that the invention is by no means limited to such a combination, since it may be used with other devices without departing from my invention wherever it is desired to intermittently transmit movement.

I claim:—

1. The combination of a liquid containing casing; a driving and a driven member therein; a liquid controlling element for the driven member actuated by the driving member; with means for alternately permitting and preventing flow of liquid under the action of said element.

2. The combination of a liquid containing casing; a driving and a driven member therein; a liquid controlling element for the driven member actuated by the driving member; with a valve for alternately permitting and preventing flow of liquid under action of said element.

3. The combination of a liquid containing casing; a driving and a driven member therein; liquid controlling elements on the driven member actuated by the driving member; means for alternately permitting and preventing flow of liquid under the action of said elements; and a device for actuating said means.

4. The combination of a liquid containing casing; a driving and a driven member therein; a liquid propelling element on the driven member actuated by the driving member; a valve for alternately permitting and preventing flow of liquid under the action of said element; and a dog for operating said valve.

5. The combination of a liquid containing casing; a driving and a driven member therein; a liquid propelling element on the driven member actuated by the driving member; a valve for alternately permitting and preventing flow of liquid under the action of said element; and two dogs for alternately actuating said valve.

6. The combination of a liquid containing casing; a driving and a driven member therein; a liquid propelling element on the driven member actuated by the driving member; means for alternately permitting and preventing flow of liquid under the action of said element; and an adjustable dog for actuating said means.

7. The combination of a liquid containing casing; a driving and a driven member therein; a liquid propelling element on the driven member actuated by the driving member; with a valve for alternately permitting and preventing flow of liquid under the action of the propelling element.

8. The combination of a liquid containing casing; a driving and a driven member therein; a liquid propelling element on the driven member actuated by the driving member; with a valve for alternately permitting and preventing flow of liquid under the action of the propelling element; and adjustable means for determining the times of action of the valve.

9. The combination of a liquid containing casing; a driving and a driven member therein; a liquid propelling element on the driven member actuated by the driving member; a valve for alternately permitting and preventing flow of liquid under the action of said element; a dog for operating said valve; and means for limiting the movement of the valve.

10. The combination of rotary driving and driven members; a liquid containing casing surrounding said members; a valve for governing the flow of liquid in the casing and capable of adjustment to cause it to couple the driving and the driven members; with means for periodically shifting the valve.

11. The combination of driving and driven members; a pump having its elements respectively connected to said members; a liquid containing casing surrounding the aforesaid parts; a valve controlling the flow of liquid to the pump and capable of causing said liquid to operatively couple the elements thereof; with means for periodically shifting the valve.

12. The combination of a driving member turned alternately in opposite directions; a driven member; and hydraulic means for coupling said members, including a valve capable of causing coupling of the members for either direction of movement of the driving member; and means for automatically causing uncoupling of the members after they have turned through a predetermined arc.

13. The combination of a liquid containing casing; a driving and a driven member; a gear in the casing connected to the driving member; a structure connected to the driven member and having a cavity for said gear; a second gear mounted on said structure and meshing with the first gear; there being cavities in the structure on opposite sides of said gears adjacent their points of engagement and passages opening from said cavities into the casing; a valve for governing the flow of liquid through said passages; and means for periodically shifting said valve.

14. The combination of a liquid containing casing; a driving and a driven member; a gear in the casing connected to the driving member; a structure connected to the driven member and having a cavity for said gear; a second gear mounted on said structure and meshing with the first gear; there being cavities in the structure on opposite sides of said gears adjacent their points of engagement and opening into the casing; a valve for governing the flow of liquid through said cavities; and adjustable dogs for periodically shifting said valve.

15. The combination of a liquid containing casing; a structure rotatably mounted therein; two intermeshing gears mounted within recesses in said structure, one of said gears being bodily movable with said structure; cavities in the structure on opposite sides of the gears and opening into the casing; a valve for controlling the flow of liquid through said passages under the action of said gears; and means for periodically actuating said valve.

16. The combination of a liquid containing casing; a structure rotatably mounted therein; a main gear operative in a cavity of the structure and concentric therewith; a plurality of auxiliary gears also mounted in cavities of the structure and meshing with the main gear; there being two chambers respectively on opposite sides of each pair formed by the main gear and one of the auxiliary gears; a valve for controlling the flow of liquid from said chambers to the casing; and means for periodically actuating said valve.

In testimony whereof, I have signed my name to this specification, in the presence of two subscribing witnesses.

SAMUEL H. KEEFER.

Witnesses:
WILLIAM E. BRADLEY,
WM. A. BARR.